Oct. 31, 1972    M. F. WICHERS    3,701,591
HEAD ENGAGING SPECTACLE STRUCTURE
Filed March 29, 1971    3 Sheets-Sheet 2
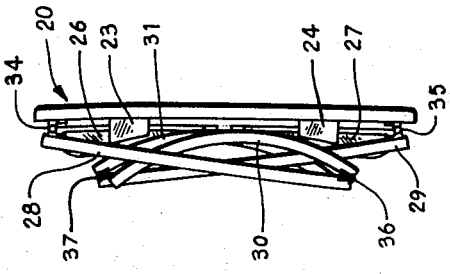
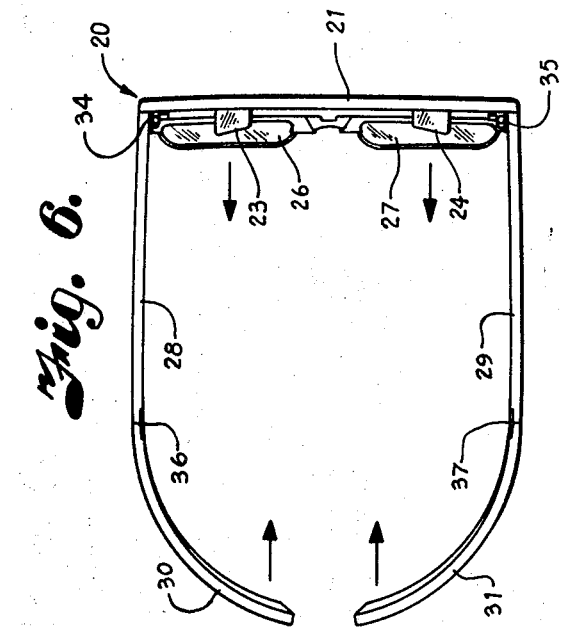
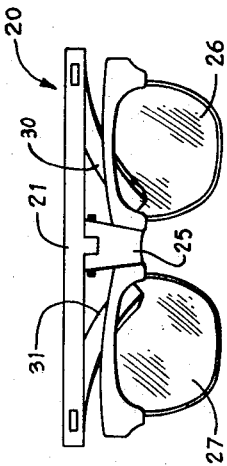
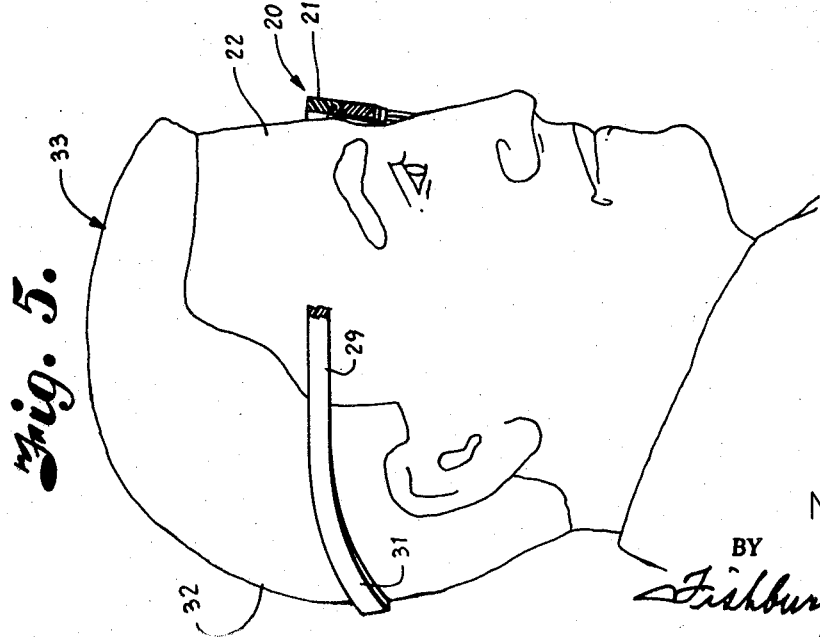
INVENTOR.
Max F. Wichers
BY
Fishburn, Gold & Litman
ATTORNEYS

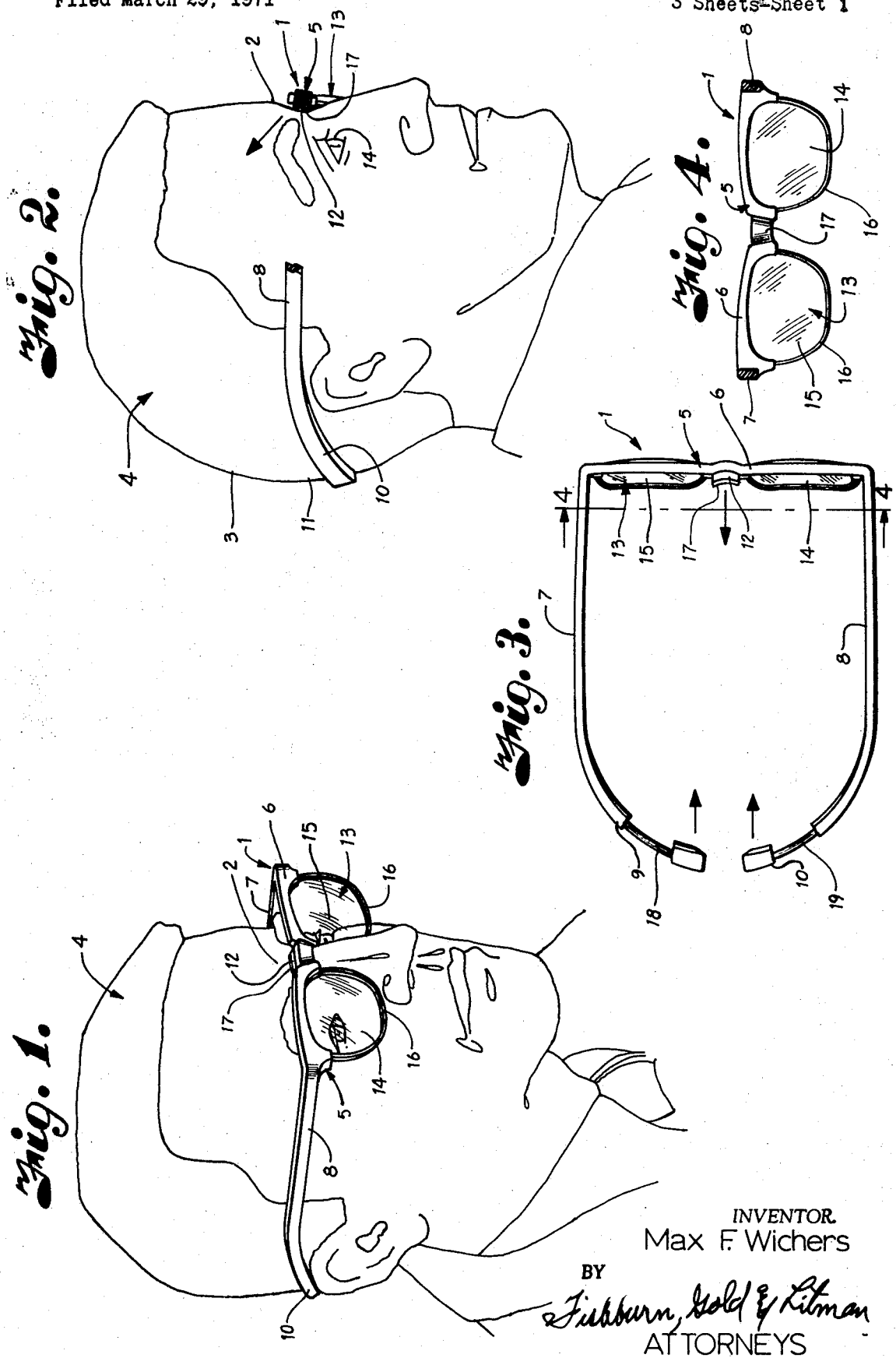

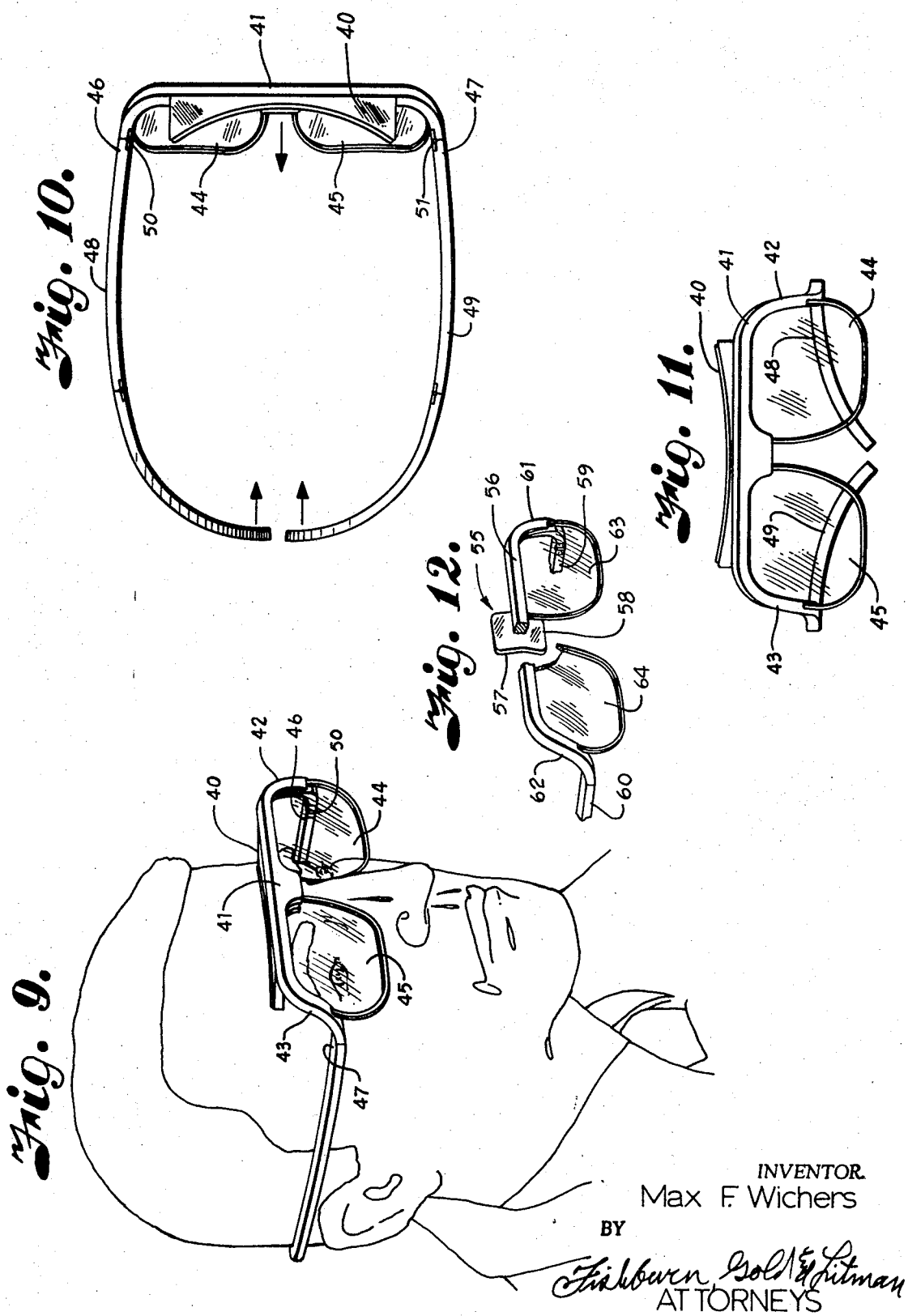

United States Patent Office 3,701,591
Patented Oct. 31, 1972

3,701,591
HEAD ENGAGING SPECTACLE STRUCTURE
Max F. Wichers, Main Mall, White Lake Center, 3636
Topeka Blvd., Topeka, Kans. 66611
Filed Mar. 29, 1971, Ser. No. 128,927
Int. Cl. G02c 3/00
U.S. Cl. 351—41                    6 Claims

ABSTRACT OF THE DISCLOSURE

A spectacle structure having portions engaging spaced parts of the head of a person to support same in proper position and includes a frame having a front positioning member engageable with a brow of the person and temple members extending rearwardly from the front positioning member and having portions shaped to engage the back portion of the head. The end portions of the temple members engage the head adjacent and below an occipital prominence and at a respective side of the head of a person wearing the spectacle structure to cooperate with the brow engagement of the front member to maintain the spectacle structure in position on the head. Lens means are mounted on the frame and depend therefrom with connectors spaced from the person's nose.

---

The present invention relates to spectacle structures and more particularly to spectacle structures engaging the brow and rearward portions of the head of a person wearing the spectacle structure.

Heretofore, spectacle structures have rested and been supported on the nose and the temples of the spectacle structure have rested on the ears and engaged the side of the head behind the ears. Such spectacle structures have the major portion of the weight thereof concentrated forward of the face of the person wearing same and, therefore, tend to bear on and slide down the nose. Springs have been added to the hinges between the lens support members and the temples, or the temples arranged with resiliency to urge the temples into engagement with the head of a person wearing same and particularly the rear ends of the temples into engagement with the side of the head behind the ears, thereby rendering the respective spectacle structures uncomfortable to wear due to the pressure on sensitive parts of the head, particularly the nose, tops of the ears, and behind the ears. Also, some people have face and nose shapes that it is difficult and in some instances impossible to fit conventional eye glass frames to remain in position thereon. Some structures, such as industrial glasses, have been supported on the head to avoid fatiguing support on the nose but such structures are large, have tight head bands or members extending over the top of the head and none are suitable or desirable for regular wear.

The principal objects of the present invention are: to provide a spectacle structure that overcomes the aforementioned difficulties and that can be worn without discomfort; to provide a spectacle structure having portions engaging the brow and the back of the head below the occipital prominence for properly positioning and maintaining the spectacle structure on the head of a person wearing same; to provide such a spectacle structure wherein the frame has a front member with temple members extending therefrom and having head contact points spaced slightly smaller than the head, said temples being resilient to thereby provide opposing forces directed toward the head at the brow and back portion thereof for holding the spectacle structure thereon; to provide such a spectacle structure wherein the opposing forces are of a small magnitude whereby the spectacle structure is comfortable to wear; to provide such a spectacle structure having weighted end portions of the temple members to counteract the resiliency of the temple members and maintain the spectacle structure in proper position on the head; to provide such a spectacle structure wherein the temple members are sectional with forward sections hingedly connected to a front member and rear sections are hingedly connected to the respective forward sections to permit folding of the spectacle structure; to provide such a spectacle structure operative to maintain same in proper position on the head without engaging the ears and nose of the wearer thereby eliminating any weight engaging same to substantially reduce irritation and pressure thereat, such as caused by portions of conventional spectacle structures; and to provide such a spectacle structure which is economical to manufacture, durable in construction, easily placed on the head of a person wearing same, sufficiently tight-fitting to permit freedom of movement of the head without dislodging the spectacle structure, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include exemplary embodiments illustrating various objects and features of the spectacle structure of the present invention.

FIG. 1 is a perspective view of a person wearing a spectacle structure embodying features of the present invention.

FIG. 2 is a side elevational view of the person wearing the spectacle structure with portions of a temple member broken away to show resilient material engaging the person wearing the spectacle structure.

FIG. 3 is a plan view of the spectacle structure.

FIG. 4 is a sectional view taken on line 4—4, FIG. 3, and showing resilient material mounted on a front member of the spectacle structure for engagement with the brow of the person wearing same.

FIG. 5 is a side elevational view of a person wearing a modified spectacle structure having a front member engageable with the forehead of the person wearing same and positioned above the eyebrows thereof and having portions of a temple member broken away to show the engagement.

FIG. 6 is a plan view of the modified spectacle structure showing a generally straight front member having pads of resilient material thereon for engagement with the forehead above the eyebrows of the person wearing same.

FIG. 7 is a front elevational view of the modified spectacle structure.

FIG. 8 is a plan view of the modified spectacle structure showing front and rear portions of temple members in a folded position.

FIG. 9 is a perspective view of a person wearing a further modified spectacle structure.

FIG. 10 is a plan view of the further modified spectacle structure of FIG. 9.

FIG. 11 is a front elevational view of the further modified spectacle structure of FIG. 9.

FIG. 12 is a fragmentary perspective view of a spectacle structure similar to the spectacle structure of FIG. 9 except having a modified front support contact member.

Referring more in detail to the drawings:

As required, detailed embodiments of this invention are disclosed herein, however, it is to be understood that the embodiments are merely exemplary of the invention which may be embodied in many forms that are different from those illustrative embodiments presented herein. Therefore, specific structural and functional details disclosed herein are not to be interpreted as limiting but merely as a basis for the claims actually defining the scope of this invention. In this regard, it is to be recognized that spectacle structures, in accordance herewith, may be embodied in various forms and furthermore that such spectacle structures may be variously shaped and have lenses variously mounted thereon, however, the disclosure herein is presented only as representative basis for teaching one skilled in the art to variously employ the present invention in virtually any appropriate detailed structure.

In the disclosed embodiment, the reference numeral 1 generally designates a spectacle structure embodying features of the present invention and having supporting engagement with a brow portion 2 and back portions 3 of the head 4 of a person wearing same. For the purpose of this invention, brow is defined as the superciliary ridge over the eyes and includes the eyebrows and forehead. The spectacle structure 1 includes a frame 5 having front portion 6 and temple members 7 and 8 extending rearwardly from the front portion 6 at each side of the head 4. The temple members 7 and 8 have rear portions 9 and 10 respectively shaped to engage the back portion 3 of the head 4 of the person wearing the spectacle structure 1. The rear portions 9 and 10 of the temple members 7 and 8 respectively preferably engage the head 4 below an occipital prominence 11 thereof and at a respective side of the head 4 to cooperate with a member or portion 12 on the front portion 6 engaging the brow to maintain the spectacle structure 1 in position on the head 4 during normal movements thereof. The frame 5 may have the front portion 6 and temple members 7 and 8 formed of one piece or in sections suitably connected for folding. The frame 5 is such that spaced portions 12 and 9 and 10 engage the brow 2 and rearward head portions 3 respectively and cooperate to support the structure with lens means 13 and 14 in proper alignment and relation to the respective eyes of the wearer. The lens means 13 and 14 include suitably ground lens 14 and 15 and supporting members 16 securing same to the frame front portion 6 whereby the lens 14 and 15 depend therefrom and are held in designed position.

In the form of the invention illustrated in FIGS. 1 to 4 inclusive, the front portion 6 and the temple members 7 and 8 and the rear portions 9 and 10 thereof are illustrated as being integral thereby forming one member. The frame 5 may be of any conventional spectacle frame material preferably resilient, such as plastic for lightness of weight and noncorrosive and like characteristics. The portions of the frame are positioned to define spaced head contacting areas slightly smaller than the spacing of respective head portions whereby the portions of the frame will exert inwardly directed and generally opposed pressures on the brow 2 and the back portion 3 of the head 4 to thereby maintain same in position.

It may be desirable to provide cushions or pads 17 of suitable material on the front member or portion 12 engageable with the brow 2 of a person wearing the spectacle structure 1. In the illustrated structure, the pad 17 is mounted on the frame front portion 6 in a position to engage the brow 2 between the eyes and above the nose of the person. The frame 5 may have the pad 17 engaging the brow 2 above or below the eyebrows and in FIGS. 1 to 4 the pad is centrally located to engage the underside of the brow above the nose.

It may be desirable to provide some weight in the rear portions 9 and 10 of the temple members 7 and 8 to balance lens weight and urge the pad 17 into engagement with the brow 2 and maintain the engagement, therefore, suitable weights 18 and 19 are arranged in the rear portions 9 and 10 to both reduce any tendency of the rear portions 9 and 10 from moving upwardly on the back portion 3 of the head 4 and to urge the pad 17 into engagement with the brow 2.

Wearing the spectacle structure 1 is accomplished by moving same downwardly over the head 4 of the person until the rear portions 9 and 10 of the temple members 7 and 8 engage the back portion 3 of the head 4 below the occipital prominence 11 and the pad 17 engages the brow 2 between the eyes. The spectacle structure 1 exerts inwardly directed and generally opposed forces or pressures on the brow 2 and the back portion 3 of the head 4 to thereby maintain same in position during normal movements of the head.

If the temple members 7 and 8 should engage the side of the head 4 of the person wearing the spectacle structure 1, the engagement should be below respective forward portions of an occipital bone of the wearer which is just behind the ear.

FIGS. 5 to 8 inclusive, illustrate a modified spectacle structure 20 having a generally straight front member 21 engageable with the forehead 22 of the person wearing same with engagement being above the eyebrows thereof. Material in the form of pads 23 and 24 are mounted on the front member 21 for engagement with the forehead 22 of the person to cushion the engagement with the forehead 22.

A lens support member 25 is mounted on the front member 21 and depends therefrom and a pair of lenses 26 and 27 are mounted on the support member 25 in any conventional manner and extend outwardly therefrom to be positioned in front of and forward of a respective eye of a person wearing the modified spectacle structure 20. The support member 25 is shown as hingedly mounted on the front member 21 whereby the lens may be swung up when use is not desired.

The modified spectacle structure 20 includes temple members 28 and 29 extending rearwardly from respective opposite ends of the front member 21 and back or rear end portions 30 and 31 of the temple members 28 and 29 respectively engage a back portion 32 of the head 33 of a person wearing the modified spectacle structure 20.

It is desirable to fold the modified spectacle structure 20 for storage, therefore, hinge means 34 and 35 connect one end of the temple members 28 and 29 respectively to the front member 21 adjacent sides thereof and hinge means 36 and 37 connect the rear portions 30 and 31 to the temple members 28 and 29 respectively to thereby permit folding of the spectacle structure 20, as best illustrated in FIG. 8.

It is desirable to have the temple members 28 and 29 and the rear portions 30 and 31 thereof engage the head 33 to thereby cooperate with the engagement of the pads 23 and 24 on the front member 21 to hold the modified spectacle structure 20 in position on the head 33 of the person wearing same during normal movements of the head, therefore, stops or shoulders limit outward swinging of the temple portions and said temples are resilient or a suitable resilient means is operatively connected to the respective hinge means 34 and 35 connecting the temple members 28 and 29 to the respective ends of the front member 21 for urging the temple members toward the head 33 of a person wearing the modified spectacle structure 20. Similar structure is provided at the hinge means 36 and 37 connecting the rear portions 30 and 31 to the temple members 28 and 29 respectively for urging the back end portions 30 and 31 toward the back portion of the head 33 thereby effecting generally opposed inwardly directed pressures on the forehead 22 and the back portion 32 of the head 33.

Wearing the modified spectacle structure 20 is accomplished by unfolding the temple members 28 and 29 and the rear portions 30 and 31 thereof and moving the modified spectacle structure 20 downwardly over the head 33 of the person to wear same until the pads 23 and 24 engage the forehead 22 above the eyebrows and the rear portions 30 and 31 engage the back portion 32 of the head 33 below the occipital prominence thereof. The lens support structure 25 is then properly positioned to place the lens 26 and 27 properly spaced from and forward of the respective eyes. The resilient means connected to the hinge means 34 and 35 and the hinge means 36 and 37 effect generally opposed inwardly directed pressures on the forehead 22 and the back portion 32 of the head 33 of the person wearing the modified spectacle structure 20 to thereby maintain same in position during normal movements of the head.

While in the structure illustrated in FIGS. 1 to 4 inclusive, is shown as a one-piece frame the pad 17 engages the brow 2 below the eyebrows, the frame may be the sectional structure, such as shown and described relative to FIGS. 5 to 8 inclusive. Also the frame of the structure shown in FIGS. 5 to 8 inclusive may be a one-piece structure. It is to be further understood that the frames may have various contours and ornamentation as desired without altering the supporting contact arrangement of the spectacle parts of the present invention.

In the form of the invention illustrated in FIGS. 9 to 11 inclusive, the engagement with the head of the wearer is substantially like that of the modified spectacle structure 20 illustrated in FIGS. 5 to 8 inclusive, wherein the forward or front contact point is above the brow and rearward contact points are below a rearward prominence of the occipital bone of the wearer.

The modified form illustrated in FIGS. 9 to 11 inclusive differs from the spectacle structure 20 illustrated in FIGS. 5 to 8 inclusive, in that a forward or front support contact member 40 is elongated and is mounted on a front or forward frame portion 41 and has such an extent or length that the engagement thereof is over the brow and above both eyes to provide a greater contact area and thereby substantially less pressure from necessary spectacle support forces.

The front or forward frame portion 41 extends substantially across the width of the spectacle structure and has downwardly extending side portions 42 and 43 at respective sidts thereof. The front or forward frame portion 41 and the side portions 42 and 43 are arranged with lenses 44 and 45 respectively connected thereto at sides and tops of the lenses 44 and 45 to provide a strong and sturdy lens mounting.

Forward or front ends 46 and 47 of temple members 48 and 49 respectively are hingedly connected to lower ends of the side portions 42 and 43, as at 50 and 51 respectively, to form frame member portions positioned substantially at the mid point of the height of the lenses 44 and 45 so that the temple members 48 and 49 extend rearwardly from slightly above a line with the eyes of the wearer.

The spectacle structure illustrated in FIGS. 9 to 11 inclusive provides a strong and sturdy mounting of the lenses 44 and 45, a substantial difference in appearance, and ease and comfort of wearing, however, support of the spectacle structure is still on the brow and under a rearward prominence of the occipital bone of the wearer as is the support of the spectacle structure 20 illustrated in FIGS. 5 to 8 inclusive.

In the form of the invention illustrated in FIG. 12, the engagement with the head of the wearer is substantially like that of the spectacle structure 1 illustrated in FIGS. 1 to 4 inclusive, wherein the forward or front contact point is both above and below the brow and between the eyes and rearward contact points are below a rearward prominence of the occipital bone of the wearer.

The modified form illustrated in FIG. 12 differs from the spectacle structure 1 illustrated in FIGS. 1 to 4 inclusive in that a forward or front support contact member 55 is mounted on a front or forward frame portion 56 and has upper and lower portions 57 and 58 respectively positioned or formed to conform to the contour of the forehead between the eyes of the wearer and engageable with the brow of the wearer above and below the eyebrows respectively and between the eyes to provide a greater contact area and thereby substantially less pressure from necessary spectacle support forces. The forward or front support contact member 55 is effective to maintain a forward portion of the spectacle structure illustrated in FIG. 12 in position and resist both upward and downward movement thereof.

The front frame portion 56 and temple members 59 and 60 are similar to the front frame member 41 and the temple members 48 and 49 of the modified spectacle structure illustrated in FIGS. 9 to 11 inclusive and side portions 61 and 62 of the front frame portion 56 are similar to the side portions 42 and 43 of the front frame portion or member 41 except shorter whereby lenses 63 and 64 may be substantially smaller in height with the front frame portion 56 being positioned generally on a line with the eyebrows of the wearer.

The pad 17 on the portion 12 of the front portion 6 and the pads 23 and 24 and suitable material on the front support contact member 40 and the front contact member 55 may be adjusted in thickness to conform to the head and bridge configuration of the wearer, such as having added thickness for the pad 17 and for material on the front contact member 55 to conform to recessed or narrow bridges and the like and to space the respective lenses from the eyes a distance sufficient to clear the eyelashes thereof and prevent contact therebetween.

It is to be understood that while I have illustrated and described certain forms of my invention, it is not to be limited to these specific forms or arrangement of parts herein described and shown.

What I claim and desire to secure by Letters Patent is:

1. A spectacle structure comprising:
   (a) a frame front member having portions engaging a forehead adjacent to and above the eyebrows of a person wearing the spectacle structure;
   (b) lens means mounted on said front member and positioned forward of and aligned with the person's eyes; and
   (c) elongate temple members connected to said front member and extending rearwardly therefrom at each side with each terminating in an inwardly turned rearward portion positioned at and engaging the back portion of the head of a person below a reraward prominence of the occipital bone, said rearward portions resiliently engaging the person's head and urging the portions of said front member into engagement with the forehead of the person, said rearward portions and front member portions applying generally opposed forces on the forehead and the back portion of the head to support the spectacle structure on the person.

2. A spectacle structure as set forth in claim 1 wherein:
   (a) said front member and said temple members are an integral one member structure; and
   (b) said one member is resilient and shaped to exert rearwardly directed pressure on the forehead above the eyebrows and forwardly directed pressure at a rearward prominence of the occipital bone at the back of the head.

3. A spectacle structure as set forth in claim 2 including:
   (a) said temple members being sectional and each having a forward portion and a rearward portion;
   (b) means hingedly connecting an end of each of said forward portions of the temple members to said front member at the respective side thereof; and
   (c) means hingedly connecting each rearward portion to said respective forward portion to permit folding of the spectacle structure.

4. A spectacle structure as set forth in claim 1 wherein:
   (a) said lens means includes a support member with lens thereon positioned forward of the eyes of a person wearing the spectacle structure; and
   (b) a hinge means hingedly mounting said support member on said front member, said hinge means having a hinge portion between the forehead engaging portions of the front member and depending therefrom, and a hinge portion on the support member between the lens and swingably connected to the hinge portion on the front member whereby said lens and support member may be swung from a normal position forward of the eyes to a raised position.

5. A spectacle structure comprising:
(a) a frame front member;
(b) pad means mounted on said front member and positioned to engage the forehead adjacent to and above the eyebrows of a person wearing the spectacle structure;
(c) lens means mounted on an dedepending from said frame front member and positioned forward of the eyes of the person;
(d) a temple member for each side of the spectacle structure and extending rearwardly from a respective side of said frame front member, said temple members each having a fordward portion and a rearward portion, said rearward portions each being shaped to to engage a back portion of the head, said engagement of each of said rearward portions of said temple members being below rearward prominences of the occipital bones of the head of a person wearing the spectacle structure, said rearward portions of the temple members applying a force on the back of the head in opposed relation to said paid means to maintain the spectacles in place;
(e) means hingedly connecting one end of each of said forward portions of said temple members to said front member at the respective end thereof;
(f) means hingedly connecting each of said rearward portions to a respective one of said forward portions of said temple members to thereby permit folding of the spectacle structure; and
(g) said rearward portions of the temple members having weight therein for facilitating maintaining engagement of the pad means with the forehead whereby the spectacle structure is characterized by the absence of contact with the ears and nose of a person wearing same and is supported by the engagement of the pad means with the forehead and the rearward portions with the back portions of the head.

6. A spectacle structure comprising:
(a) a front frame member;
(b) lens means mounted on said front frame member and having a spacing therebetween wider than adjacent nose portions of a wearer of the spectacle structure whereby there is an absence of contact therewith;
(c) said front frame member extending downwardly at sides thereof and secured to said lens means at top sides thereof;
(d) an elongated forward support contact member on said front frame member and having supporting engagement with the forehead adjacent to and above eyebrows of the wearer;
(e) temple members hingedly connected to said front frame member adjacent sides of said lens means and extending rearwardly therefrom; and
(f) said temple members each having a rearward portion having supporting engagement with the head at a rearward prominence of the occipital bone of the wearer whereby the spectacle structure is characterized by absence of contact with the ears and nose of a person wearing same, the exerting of inwardly directed and generally opposed forces on the forehead and the back portion of the head, and the supporting engagement of said rearward portions of said temple members with said rearward prominence and the forward support contact member with the forehead adjacent to and above the eyebrows serving to retain the spectacle structure in position on the person.

References Cited

UNITED STATES PATENTS

| | | | |
|---|---|---|---|
| 104,216 | 6/1870 | Sickles | 351—156 |
| 1,118,719 | 11/1914 | Wirth | 351—156 |
| 3,173,147 | 3/1965 | Gross et al. | 351—156 |
| 3,612,669 | 10/1971 | Vinson | 351—123 |
| 3,475,083 | 10/1969 | Gitlin et al. | 351—41 |
| 1,794,571 | 3/1931 | Wrighton et al. | 351—121 X |
| 1,854,060 | 4/1932 | Pettersson | 351—119 |
| 2,986,970 | 6/1961 | Kilgour et al. | 351—41 X |
| 2,108,074 | 2/1938 | McMahon | 351—119 X |
| 3,419,909 | 1/1969 | Spain | 351—41 UX |

FOREIGN PATENTS

| | | | |
|---|---|---|---|
| 1,295,891 | 5/1962 | France | 351—130 |

DAVID SCHONBERG, Primary Examiner

R. L. SHERMAN, Assistant Examiner

U.S. Cl. X.R.

351—113, 119, 156